United States Patent [19]
Yoshizumi et al.

[11] Patent Number: 6,026,583
[45] Date of Patent: Feb. 22, 2000

[54] SHAPE MEASURING APPARATUS AND METHOD

[75] Inventors: Keiichi Yoshizumi, Higashiosaka; Hiroyuki Takeuchi, Hirakata; Keishi Kubo, Moriguchi; Yukio Imada, Hirakata; Koji Handa, Osaka, all of Japan

[73] Assignee: Matsushita Electric Industrial Co., Ltd., Osaka-fu, Japan

[21] Appl. No.: 08/988,397

[22] Filed: Dec. 10, 1997

[30] Foreign Application Priority Data

Dec. 11, 1996 [JP] Japan ................................. 8-330659

[51] Int. Cl.⁷ ................................................. G01B 11/24
[52] U.S. Cl. ................................. 33/503; 33/549; 33/554
[58] Field of Search ........................... 33/503, 1 M, 549, 33/550, 551, 553, 554, 555, 556, 558, 559, 561

[56] References Cited

U.S. PATENT DOCUMENTS

| | | | |
|---|---|---|---|
| 3,392,452 | 7/1968 | Haun | 33/549 |
| 3,600,811 | 8/1971 | Weyrauch | 33/1 M |
| 4,080,741 | 3/1978 | Siddall et al. | 33/503 |
| 4,255,862 | 3/1981 | Nakamura | 33/503 |
| 4,611,156 | 9/1986 | Feichtinger | 33/503 |

OTHER PUBLICATIONS

Applied Optics, vol. 26, No. 9, issued May 1, 1987 to K. Yoshizumi and entitled "Ultrahigh Accuracy 3–D Profilometer".

Primary Examiner—Christopher W. Fulton
Attorney, Agent, or Firm—Wenderoth, Lind & Ponack, L.L.P.

[57] ABSTRACT

A shape measuring apparatus includes an object measuring device, a holding base, a reference plane measuring device, and a length measuring unit. The holding base holds an object-to-be-measured on its surface and has a reference plane provided on its back side so that a measured surface of the object and the reference plane can be simultaneously scanned by the object measuring device and the reference plane measuring device, respectively. Therefore, the object and the reference plane can sway integrally with each other, and the accuracy of measurement of the measured surface is not influenced by any moving straightness deviation of the holding base unless any change occurs in relative positions of the reference plane and the measured surface. Therefore, the shape of the measured surface can be measured with the flatness accuracy of the reference plane.

17 Claims, 13 Drawing Sheets

$\Delta Z_M \cong 0.01 \mu m$ $\Delta Z_S \cong 0.5 \mu m$

SHAPE MEASURING APPARATUS AND METHOD

BACKGROUND OF THE INVENTION

The present invention relates to a shape measuring apparatus and method for measuring, with ultrahigh precision, the shape, surface roughness, undulation flatness, etc. of a measured surface in, for example, semiconductor wafers and aspherical lenses.

Recently, for measurement of, for example, surface configuration of semiconductor wafers, free curved surface configuration and surface roughness of aspherical lenses and the like, it has become necessary to satisfy measurement accuracy requirements to the order of submicron to nanometer levels or less. Three-dimensional measuring devices and surface roughness measuring devices known in the art typically have a construction as shown in FIG. 15. That is, on a surface plate 101, on which an object-to-be measured 102 is placed, there are mounted moving members 104, 105, 106 which are respectively operative to move a probe 103 in X, Y and Z directions as shown, the probe 103 having a function to contact a measured surface 102a of the object 102 to carry out measurement of surface configuration of the object. The moving member 104 is of a gantry shape and is slidable in Y direction along rails 107, 107 laid in parallel on the surface plate 101. The moving member 105, as X moving member, is mounted on a beam portion 104a of the moving member 104 and is slidable along the beam portion 104a in X direction. The moving member 106, as Z moving member, is so mounted to the X moving member 105 as to be slidable in Z direction and has a probe 103 at its lower end.

In such three dimensional measuring devices and the surface roughness measuring devices of the prior art, rollers, air slide, oil bearings, etc. are used as means for sliding respective moving members 104, 105, 106 in X, Y and Z directions. Where such means are used, however, there is a problem that when the moving members are moved several millimeters to several hundred millimeters, achievable moving straightness deviation is limited to about 1 $\mu$m in one of the axial directions X, Y, Z. So, when the moving members are respectively moved in three axial directions X, Y, Z, the resulting moving straightness deviations, when totalled, would easily come up to the order of several micrometers. With the conventional measuring devices, therefore, it is impossible to measure the shape of such a measured surface as aforesaid to such a measurement accuracy of submicron meter to nanometer order or less. Similarly, aforesaid problem would occur with measuring devices of polar coordinate type and cylindrical coordinate type because the rotary table involves the problem of low accuracy in respect of moving circularity deviation.

As already stated, the conventional threedimensional measuring devices and the surface roughness measuring devices are of such arrangement that the probe 103 is moved and object 102 is not moved. However, no measuring device of reversed arrangement has been known such that the probe is held stationary and the object is moved.

SUMMARY OF THE INVENTION

Accordingly, an object of the present invention is to provide a shape measuring apparatus and method which is capable of measuring the shape of an object to a measuring accuracy of from submicron to nanometer order or less.

In accomplishing the object, according to a first aspect of the present invention, there is provided a shape measuring apparatus for measuring the shape of a measured surface of an object-to-be-measured by using an object measuring device, comprising:

a holding base for holding the object on a surface of the holding base, with a reference plane provided on a back side of the holding base;

a reference plane measuring device for scanning a reference side-spot on the reference plane which is located on an axial line extending in a direction of thickness of the holding base, the reference side-spot corresponding to a measured side-spot on the measured surface scanned by the object measuring device and being scanned simultaneously with the scanning of the measured side-spot, thereby measuring a quantity of displacement of the reference plane in the direction of thickness of the holding base; and a length measuring unit for computing shape information on the measured surface in relation to the reference plane on the basis of information on relative positions of the reference plane and an object mount surface of the holding base, shape measurement information fed by the object measuring device upon relative movement of the holding base and the object measuring device, and the quantity of displacement fed by the reference plane measuring device.

According to a second aspect of the present invention, there is provided a shape measuring apparatus for measuring a shape of a measured surface of an object-to-be-measured placed on a lower surface plate and fixed thereto by moving an object measuring device, the apparatus comprising:

a gantry-type Y table mounted across a pair of legs erected on the lower surface plate which extend in parallel in Y-direction with the object disposed therebetween, the Y table being movable in the Y-direction;

an X table set on the gantry-type Y table and movable on the Y table in X-direction perpendicular to the Y-direction;

an upper surface plate disposed on the X table and including length measuring optical systems oriented in X, Y and Z directions which utilize laser light;

a Z table mounted to the upper surface plate and movable in the Z direction;

a probe mounted to the Z table for measuring a quantity of displacement of the measured surface in the Z direction, the probe including a stylus contacting the measured surface and a mirror provided integrally with the stylus;

a frame set upright on the lower surface plate and having a Z reference plane to be used for measurement by the probe of the quantity of displacement in the Z direction, the Z reference plane covering the range of movement of the probe;

an object measuring device for measuring a distance Z1 between the upper surface plate and the Z reference plane and a distance Z2 between the upper surface plate and the mirror on a generally coaxial basis, thereby to measure a distance in the Z direction;

an X reference plane provided on the lower surface plate for use in measuring a quantity of movement of the X table in the X-direction;

an X reference plane measuring unit for measuring a distance between the upper surface plate and the X reference plane in the X-direction;

a Y reference plane provided on the lower surface plate for use in measuring a quantity of movement of the Y table in the Y-direction;

a Y reference plane measuring unit for measuring a distance between the upper surface plate and the Y reference plane in the Y-direction; and a control unit which performs a three-dimensional measurement of the measured surface on the basis of the Z directional distance, the X directional distance, and the Y directional distance.

According to a third aspect of the present invention, there is provided a shape measuring method for measuring a shape of an object-to-be-measured by employing a shape measuring apparatus which has a holding base for holding the object on a front surface of the holding base, with a reference plane provided on a back side of the holding base, and which recognizes information on relative positions of an object mount surface and the reference plane, the shape measuring method comprising:

moving an object measuring device for measuring a shape of a measured surface of the object and the holding base in relation to each other, thereby causing the object measuring device to scan the measured surface to provide information on shape measurement of the measured surface;

scanning a reference side-spot on the reference plane by a reference plane measuring device simultaneously with the scanning of the measured surface by the object measuring device, the reference side-spot being located on an axial line extending in a direction of thickness of the holding base, and corresponding to a spot scanned by the object measuring device;

measuring a quantity of displacement of the reference plane in the direction of thickness of the holding base on the basis of the scanning on the reference plane by the reference plane measuring device; and computing shape information on the measured surface relative to the reference plane and on the basis of the shape measurement information, the quantity of displacement, and the information on the relative positions.

According to the above stated arrangement of the first and second aspects of the present invention, as well as the shape measuring method of the third aspect, the following effects can be obtained. Since the reference plane is provided on the holding base which holds the object in position so as to enable the measured surface of the object to be scanned simultaneously with the reference plane, the object and the reference plane can sway or bend integrally with each other even if any sway or bend of micrometer order occurs in respect of moving straightness deviation when the object measuring device and the holding base are moved relative to each other. Therefore, the accuracy of measurement of the measured surface is not influenced by aforesaid moving straightness deviation, and thus the shape of the measured surface can be measured with the flatness accuracy of the reference plane.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
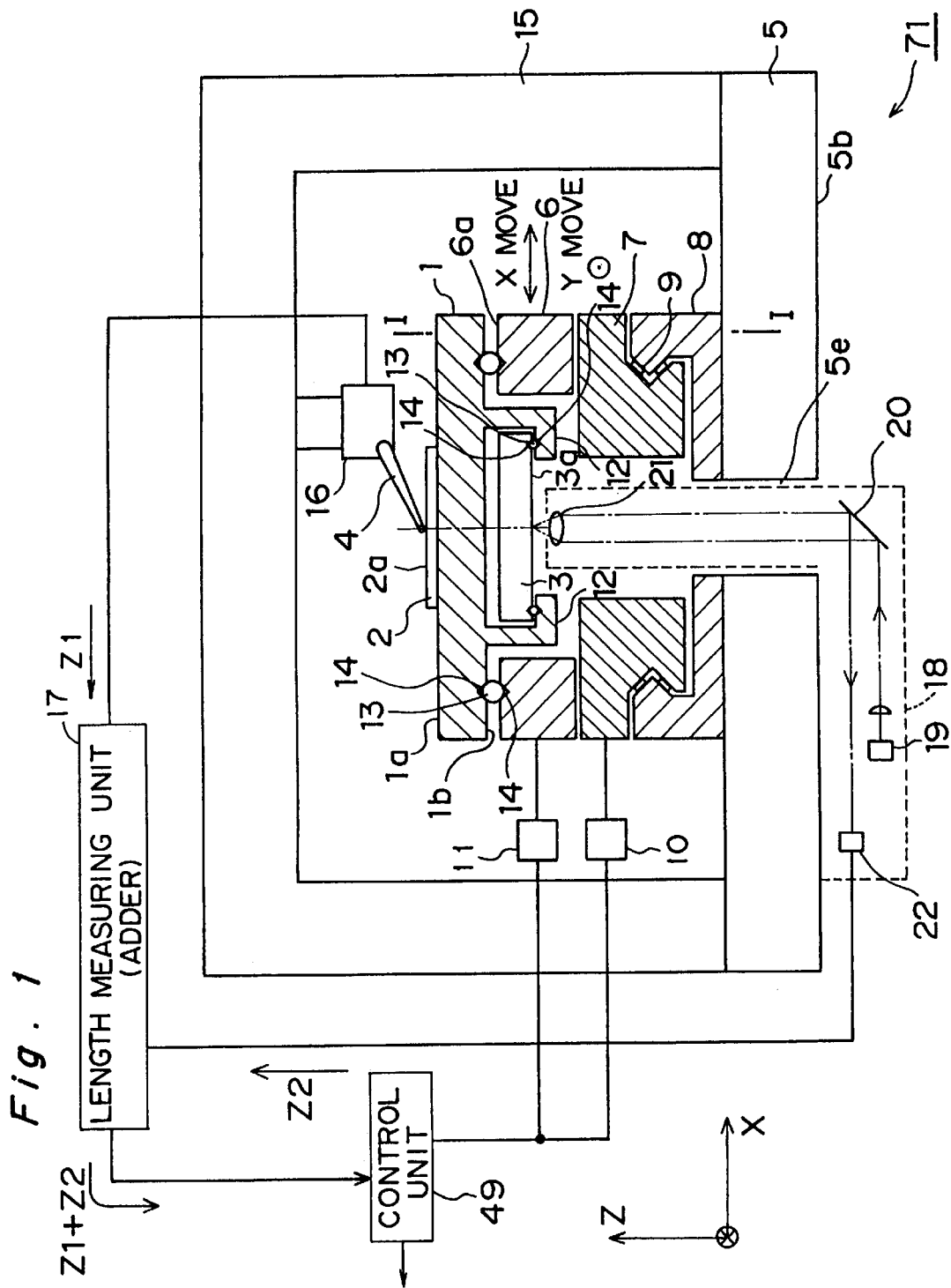
FIG. 1 is a view showing the construction of a shape measuring apparatus as one embodiment of the present invention.

A shape measuring apparatus and method in the embodiments of the present invention will now be described with reference to the accompanying drawings. The shape measuring method is carried out by the shape measuring apparatus. In the drawings, component parts which perform an identical or similar function are designated by like reference numerals.

Referring to FIGS. 1 through 4, there is shown a shape measuring apparatus which carries out a three dimensional measurement with respect to a configuration of a measured surface 2a of an object-to-be measured 2, the apparatus including a holding base 1 on which the object 2 is placed, and a reference plane 3a so that the shape of the measured surface 2a can be measured by scanning and measuring the measured surface 2a and the reference plane 3a simultaneously.

First, the shape measuring apparatus 71 shown in FIG. 1 is described. This shape measuring apparatus 71 is a shape measuring apparatus for measuring the shape of the object 2 such as a semiconductor wafer in which measurement accuracy of the quantity of movements in an X-axis direction and a Y-axis direction (hereinafter called the X,Y-directions) is comparatively less required.

Figure 5:
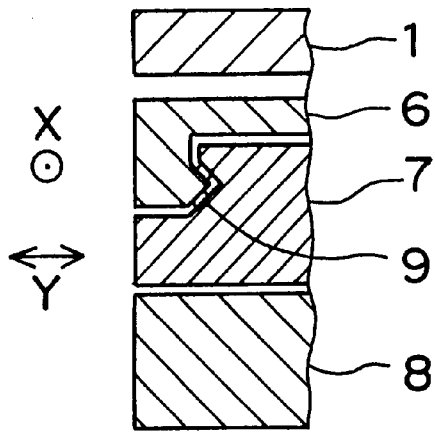
FIG. 5 is a sectional view taken along the line I—I shown in FIG. 1.

On a lower stone surface plate 5, as a body base, is fixed a base plate 8 of X and Y-tables for sliding the holding base 1 as an upper stone surface plate along the X,Y-directions. The base plate 8 and a Y-table 7 are in engagement with each other through a roller bearing 9. The Y-table 7 is slidable relative to the base plate 8 in the Y-direction, or a direction perpendicular to the surface of the FIG. 1 sheet, by means of a drive unit 10 having, for example, a feed screw and a motor for rotating the feed screw. As shown in the FIG. 5 sectional view taken along the Y-direction, though not shown in FIG. 1 which is a sectional view taken along in the X-direction or a direction parallel to the surface of FIG. 1 sheet, an X-table 6 is in engagement with the Y-table 7 through a roller bearing 9 and, as is the case with the Y-table 7, the X-table 6 is slidable relative to the Y-table 7 in the X-direction by means of a drive unit 11 having, for example, a feed screw and a motor for rotating the feed screw.

Each of the drive units 10, 11 feeds, for example, the rotation speed of the motor respectively to a control unit 49. The control unit 49 computes X and Y coordinates which are presently scanned on the measured surface 2a of the object 2, on the basis of the relation between each of the rotation speeds of respective motors and each of the quantity of movements of respective tables 6, 7 in the X, Y-directions.

Figure 6:
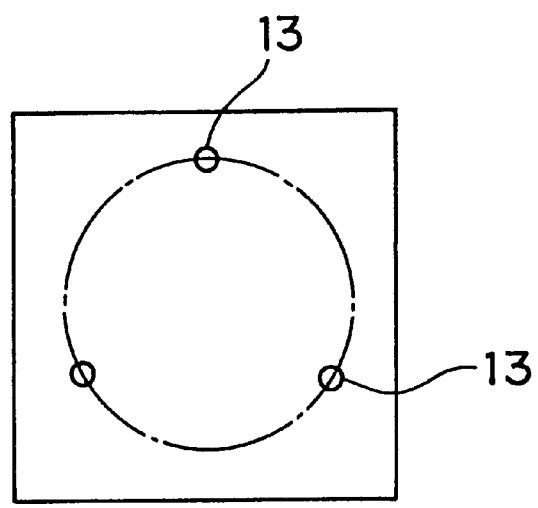
FIG. 6 is a plan view for explaining the positions at which the balls shown in FIG. 1 are set.
Figure 7:
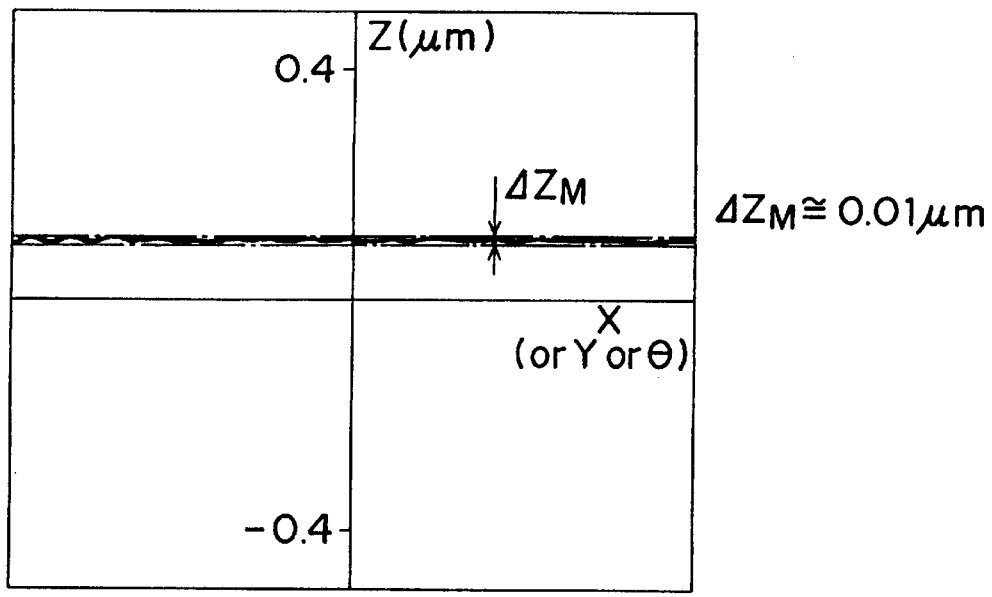
FIG. 7 is a graph showing the flatness of the reference plane shown in FIG. 1.

The object 2 is fixedly set on an object mount surface 1a of the holding base 1 and, on the back 1b side of the holding base, a reference plate 3 formed with the reference plane 3a is held in place, the reference plane 3a confronting the lower stone surface plate 5. The reference plane 3a which will be described hereinafter is a mirror surface to be irradiated with laser light for measuring the quantity of displacement along a Z-direction of the holding base 1, or the measured surface 2a of the object 2, upon movement of the holding base 1 by means of the X-table 6 and Y-table 7 in the X, Y-directions, and has a flatness $\Delta Z_M$ of 0.01 micrometer order as shown in FIG. 7. In the holding base 1 of the present embodiment, the reference plate 3, as shown, is supported and temporarily fixed through three balls 13 on a support member 12 of L shape in section which extends from the back 1b of the holding base 1 toward the lower stone surface plate 5. The balls 13, as shown in FIG. 6, are arranged at three locations with the same intervals so that they are positioned on respective apexes of a regular triangle. The reference plane 3a and the support member 12 are each formed, at portions to be contacted by the balls, with a groove 14 adapted to come into point-contact with the spherical surface of the balls. By supporting the support member 12 and the reference plate 3 at three points in this way it is possible to prevent the reference plate 3 from wobbling relative to the support member 12. The reference plane 3a may be formed on the back 1b of the holding base 1, in which case the reference plate 3 need not be provided.

Such a holding base 1 is similar to the case of the reference plate 3 and is mounted on an upper surface 6a of the X-table 6 through three balls 13 arranged on grooves formed at three locations, as shown in FIG. 6, on the upper surface 6a of the X-table 6 and on the back 1b of the holding base 1.

While, on a frame 15 erected on the lower stone surface plate 5 there is fixed an object measuring device 16 provided with a probe 4 which contacts the measured surface 2a of the object 2 to detect the configuration of the measured surface 2a. The output of the object measuring device 16 is connected to a length measuring unit 17.

On a back 5b side of the lower stone surface plate 5, there is provided a reference plane measuring device 18 for detecting the quantity of displacement of the reference plane 3a along the Z-direction which is equipped with a laser light source 19, a mirror 20, an objective lens 21, and an optical sensor 22. As may be understood from this, the object measuring device 16 including the probe 4, and the reference plane measuring device 18 do not move. The reference plane measuring device 18 detects the quantity of displacement of the reference plane 3a in the Z-direction according to a known triangulation method which will be hereinafter described roughly. The laser light source 19 includes a semiconductor laser element and emits laser light of 780 nm wavelength. Laser light emitted from the laser light source 19 is reflected by the mirror 20 and, after passing through an aperture 5c, the light is projected onto the reference plane 3a through the objective lens 21. Laser light reflected from the reference plane 3a is detected by the optical sensor 22 through the objective lens 21 and the mirror 20. In this case, if any change occurs in Z-directional distance between the objective lens 21 and the reference plane 3a, there occurs a change in the position of the return laser light incidence on the light sensing plane of the optical sensor 22, resulting in a change in the detected amount of light. The optical sensor 22 sends a signal corresponding to such a change in the amount of light to the length measuring unit 17.

The probe 4 and the objective lens 21 are so arranged that the position at which the probe 4 contacts the measured surface 2a of the object 2 and the position at which the reference plane 3a is irradiated with the laser light may be coaxially located in the direction of thickness of the holding base 1, or in the Z-direction in the present embodiment. By employing such an arrangement it is possible to avoid the influence of any change in inclination of the X-table 6 and Y-table 7 due to the movement of the X-table 6 and Y-table 7.

The length measuring unit 17 performs an add operation with respect to an output signal Z1 from the object measuring device 16 which corresponds to a shape measurement information and an output signal Z2 from the reference plane measuring device 18. Naturally, the length measuring unit 17 has previously recognized relevant information on relative positions of the object mount surface 1a on the holding base 1 and the reference plane 3a. A specific example of such information on relative positions is information on the distance in the Z-direction between the object mount surface 1a and the reference plane 3a in the case where, for example, each of positions in the X and Y-directions of the object mount surface 1a and the reference plane 3a is same. Since the length measuring unit 17 has information relevant to such relative positions in this way, the reference plane 3a and the object mount surface 1a need not be parallel to each other.

Since the object 2 and the reference plane 3 are disposed on the same holding base 1, when the holding base 1 is moved by the X-table 6 and Y-table 7 in the X and Y-directions, the quantity of displacement in the Z-direction which corresponds to moving straightness deviation due to movement of X-table 6 and Y-table 7 is same with respect to the measured surface 2a of the object 2 and the reference plane 3a of the reference plate 3. Therefore, as stated above, the length measuring unit 17 performs an add operation with respect to the output signals Z1 and Z2, and considers the information on relative positions into the results of the add operation. Hence, the length measuring unit 17 can send information on the shape of the measured surface 2a of the object 2 such that the information does not include the quantity of displacement in the Z-direction which corresponds to the moving straightness deviation due to the movement of the X-table 6 and Y-table 7.

The output of the length measuring unit 17 is sent to the control unit 49. As already stated, the control unit 49 recognizes X and Y coordinates of the spot being presently scanned on the measured surface 2a. Therefore, by being supplied with the shape information at the spot being scanned, the control unit can send threedimensional shape information in the X, Y, and Z coordinates on the spot being scanned. In this way, such three dimensional shape information with respect to subsequent scan spots is sequentially obtained, whereby three dimensional shape measurement can be carried out of the measured surface 2a.

Operation of the shape measuring apparatus 71 constructed as above described will be described below.

An object 2, such as a semiconductor wafer, is held in an object setting position on the object mount surface 1a of the holding base 1. Then, the probe 4 of the object measuring device 16 is caused to contact the measured surface 2a of the object 2. The reference plane measuring device 18 is operated so that the reference plane 3a is irradiated with the laser light. In this case, a spot at which the measured surface 2a is contacted by the probe 4 and a spot at which the reference plane 3a is irradiated with the laser light are positioned generally coaxially in the Z-direction. By arranging the contacted position by the probe 4 and the irradiated position by the laser light in this way, it is possible to make measuring operations less subject to the influence of pitching, yawing and rolling of X table 6 and Y table 7. In such a state of operation, each motor provided in the drive units 10, 11 is driven to move the X-table 6 and the Y-table 7 in the X and Y-directions respectively so that the probe 4 can scan the measured surface 2a in the X and Y-directions.

Figure 8:
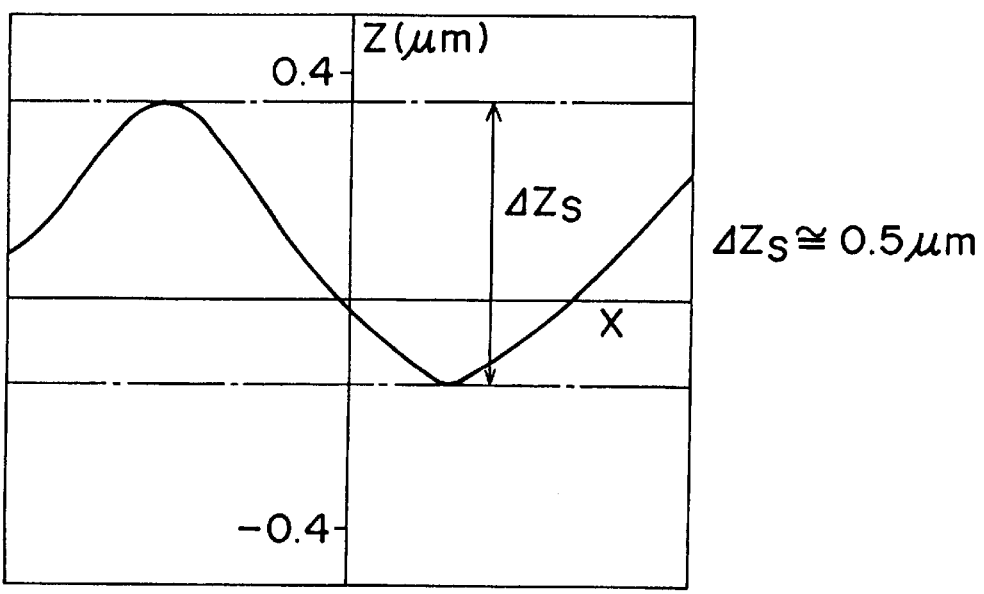
FIG. 8 is a graph showing the quantities of undulation components produced in the Z direction upon movement of the X-table shown in FIG. 1.

In this case, since the X-table 6 and Y-table 7 use the roller bearings, as is similar to the conventional art, for example, as shown in FIG. 8, an undulation component of about 0.5 μm is produced in the Z-direction. FIG. 8 is a graph showing the undulation component produced by moving the holding base 1 along the X-direction by means of the X-table 6. When the holding base 1 is moved by the Y-table along the Y-direction, an undulation component of about 0.5 μm is also produced in the Z-direction. Therefore, such undulation component is included in the output signal Z1 from the object measuring device 18.

While, the reference plane 3a is irradiated with the laser light, and the reference plate 3 having the reference plane 3a is fixed to the holding base 1. Therefore, the aforesaid undulation component is also included in the output signal Z2 from the optical sensor 22. Meanwhile, the flatness deviation of the reference plane 3a, being of the order of 0.01 μm, is very small as compared with aforesaid undulation component. Therefore, it may be considered that the output signal Z2 almost include such undulation component only in a practical sense. Accordingly, at the length measuring unit 17, the output signals Z1 and Z2 are added up after the information on the relative positions is considered. Thus, the length measuring unit 17 provides information on the Z directional configuration of the measured surface 2a of the object 2 which contains no undulation component.

As earlier stated, X and Y coordinates for X and Y directional scan spots on the measured surface 2a are supplied from the drive units 10 and 11 to the control unit 49. Therefore, when the information on Z directional shape is supplied from the length measuring unit 17 to the control unit 49, the control unit 49 can send three dimensional shape information covering X, Y, Z directional configurations at scan spots on the measured surface 2a.

Figure 2:
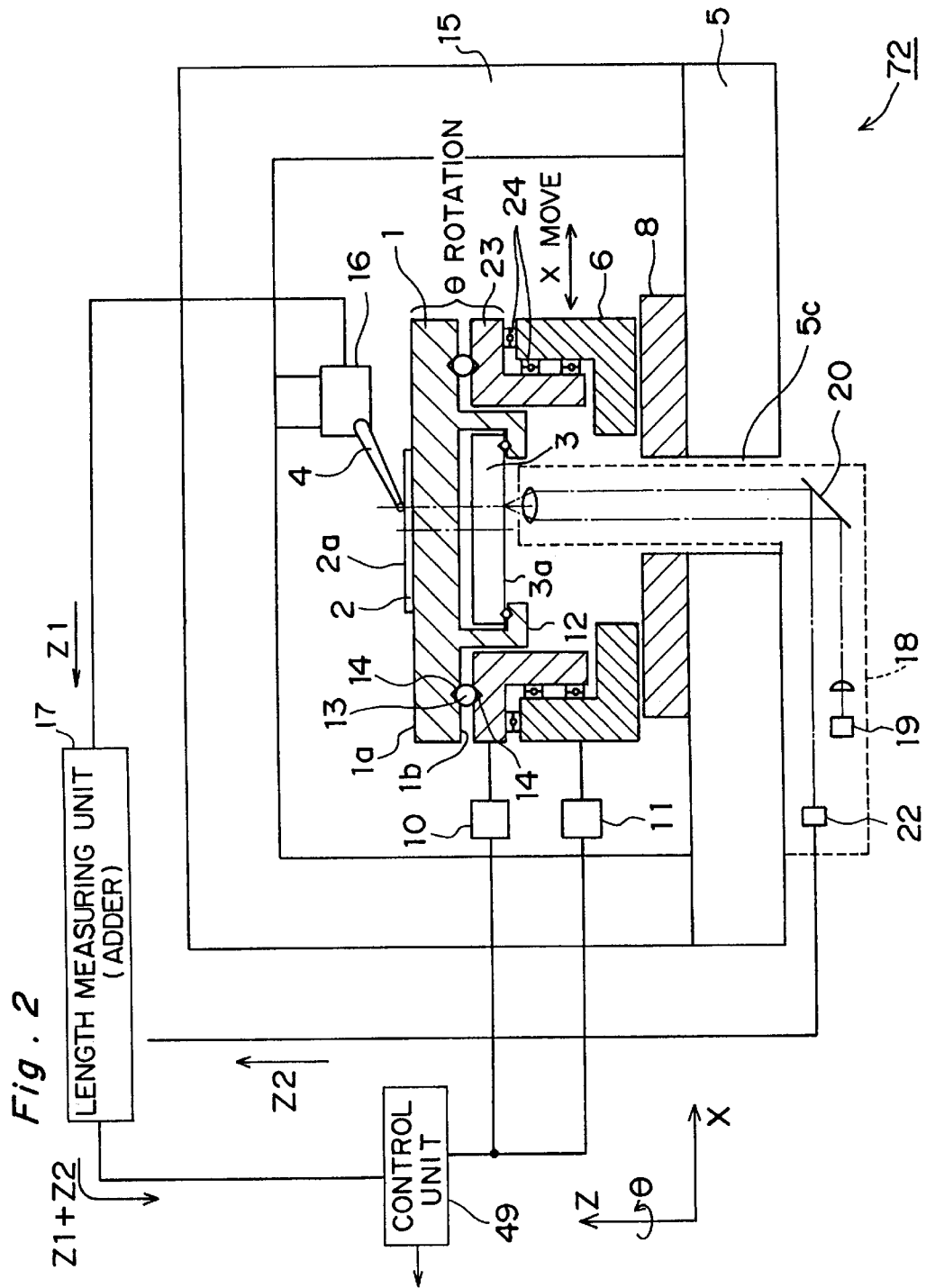
FIG. 2 is a view showing another form of the shape measuring apparatus shown in FIG. 1.

As described above, the shape measuring apparatus 71 is of the type in which the holding base 1 is moved in X and Y-directions, a shape measuring apparatus 72 shown in FIG. 2 is of the type such that the holding base 1 is moved in θ direction, instead of the Y-direction, and in the X-direction. The apparatus of the latter mentioned type can exhibit good performance similar to that of the shape measuring apparatus 71. It is noted in this conjunction that the term "θ direction" means a circumferential direction around an imaginary axis extending along the Z-direction. In the shape measuring apparatus 72, the X-table 6 is slidably held in engagement with the bed plate 8 through the roller bearing 9 as shown in FIG. 1, though not shown in FIG. 2 which shows a section viewed along the X-direction. A θ-table 23 which is rotatable in the θ direction is mounted to the X-table 6 through bearings 24. The holding base 1 is mounted on the θ-table 23 through three balls 13 in the same way as in the shape measuring apparatus 71. Therefore, the holding base 1 is rotatable in conjunction with the θ-table 23 in the θ-direction.

Next, a shape measuring apparatus 73 is described with reference to FIG. 3.

Figure 3:
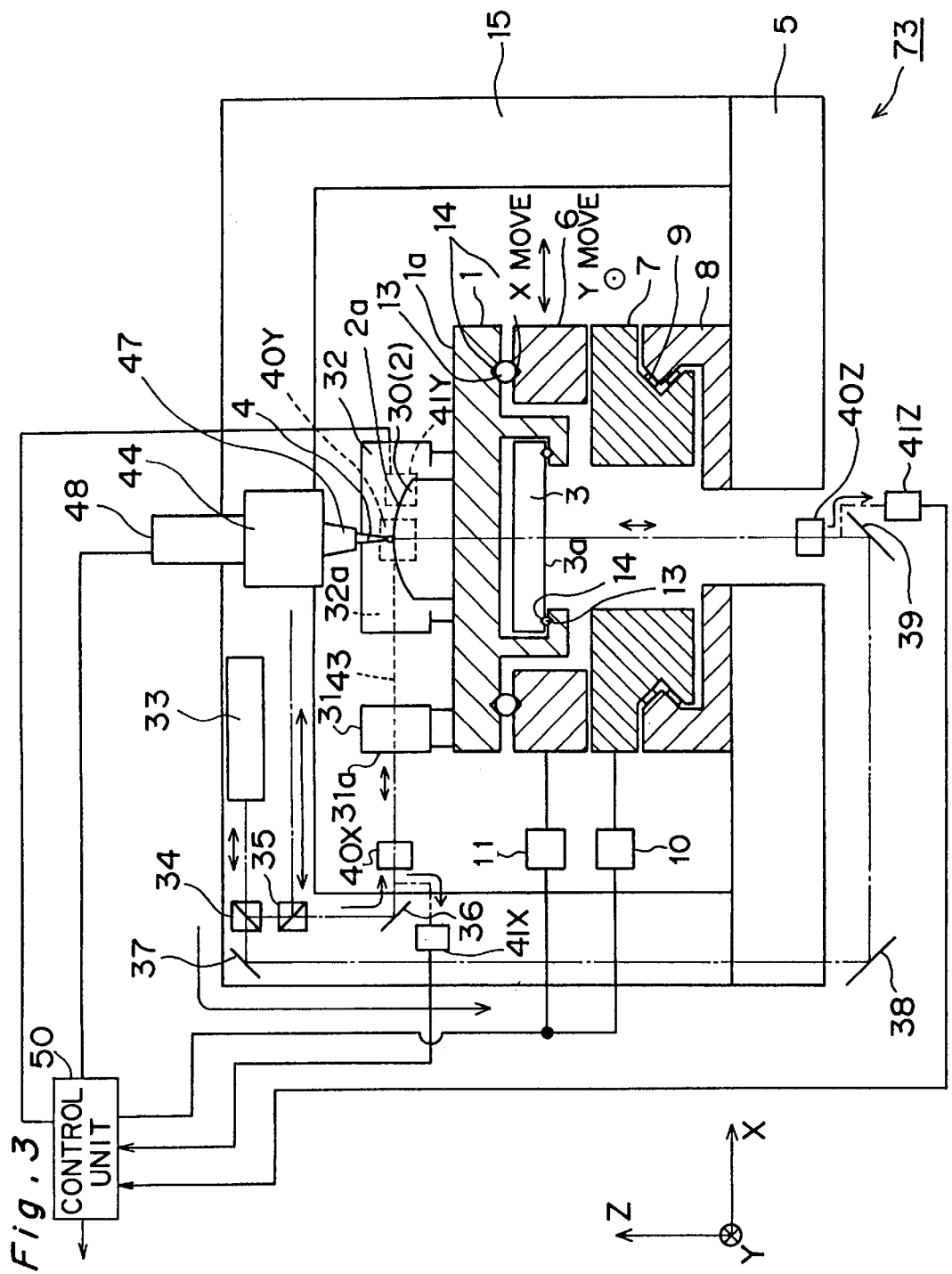
FIG. 3 is a view showing a further form of the shape measuring apparatus shown in FIG. 1.

The shape measuring apparatus 73 has a structure that precision is required with respect to the amount of movement along X and Y-directions of the measuring point as in the case where the object 2 is an aspherical lens 30, for example, as shown in FIG. 3. In the shape measuring apparatus 73, construction of movable parts of the holding base 1 for movement along the X and Y-directions is the same as that in the earlier described shape measuring apparatus 71, therefore, the description to follow pertains only to those structural points in which the apparatus 73 is different from the shape measuring apparatus 71.

On the object mount surface 1a of the holding base 1, there are also mounted a reference plate 31 and a reference plate 32. The reference plate 31 has an X-reference plane 31a extending in the Y-direction and being a mirror surface for reflecting laser light in order to enable measurement of the quantity of movement, that is, measurement of X coordinates of the object 2 through the use of laser light when the object 2 is moved in the X-direction. The reference plate 32 has a Y-reference plane 32a extending in the X-direction and being a mirror surface for reflecting laser light in order to enable measurement of the quantity of movement, that is, measurement of Y coordinates of the object 2 through the use of the laser light when the object 2 is moved in the Y-direction. Each of the X-reference plane 31a and the Y-reference plane 32a is formed by a mirror having a flatness deviation of 0.01 micrometer order. Just as in the case of the shape measuring apparatus 71, measurement of the quantity of displacement of the object 2 in the Z-direction is carried out by irradiating the reference plane 3a with laser light. The quantity of movement in the X-direction corresponds to the quantity of a relative movement in the X-direction, and the quantity of movement in the Y-direction corresponds to the quantity of a relative movement in the Y-direction.

For laser length measurement using the reference planes 31a, 32a, 3a, a known laser length measuring method is employed such that each phase variation in each reflected laser light that is reflected onto each of the reference planes is detected by countering interference signals between each incident laser light on respective reference plane and each reflected laser light. In such a laser length measuring method, as described, for example, in Japanese Patent Application Laid-Open No. 4-1503, each laser light falling on the respective reference plane is split by a splitting member, such as prism, into reference light and measuring light, and the reference light and the measuring light are shifted in phase by 90 degrees from each other. Each measuring light is caused to fall on respective reference plane and reflect therefrom, and each interference light produced due to the phase shifting between each reflected light and each reference light is electrically detected and, accordingly, each of interference fringe signals is formed. Thus, the distance between each reference spot and respective reference plane is measured on the basis of each Lissajous's figure drawn from such interference fringe signals.

Further, the shape measuring apparatus 73 includes a laser light source 33 for irradiating the X-reference plane 31a, the Y-reference plane 32a and the reference plane 3a with laser light, and an optical sensor operative to detect the reflected laser light and perform laser length measurement, the laser light source 33 and the optical sensor being mounted in the frame 15. In the present embodiment, the laser light source 33 is an He—Ne frequency stabilized laser which oscillates with one frequency. As already stated, laser light, as the measuring light, is projected onto respective reference planes 31a, 32a, and 3a, whereas laser light, as the reference light, is used for preparation of aforesaid interference signal with respect to the interference between the reference light and the reflected light from the reference plane as return light of the measuring light. The laser light to be used may have one frequency as in the present embodiment, or may have two frequencies.

Figure 10:
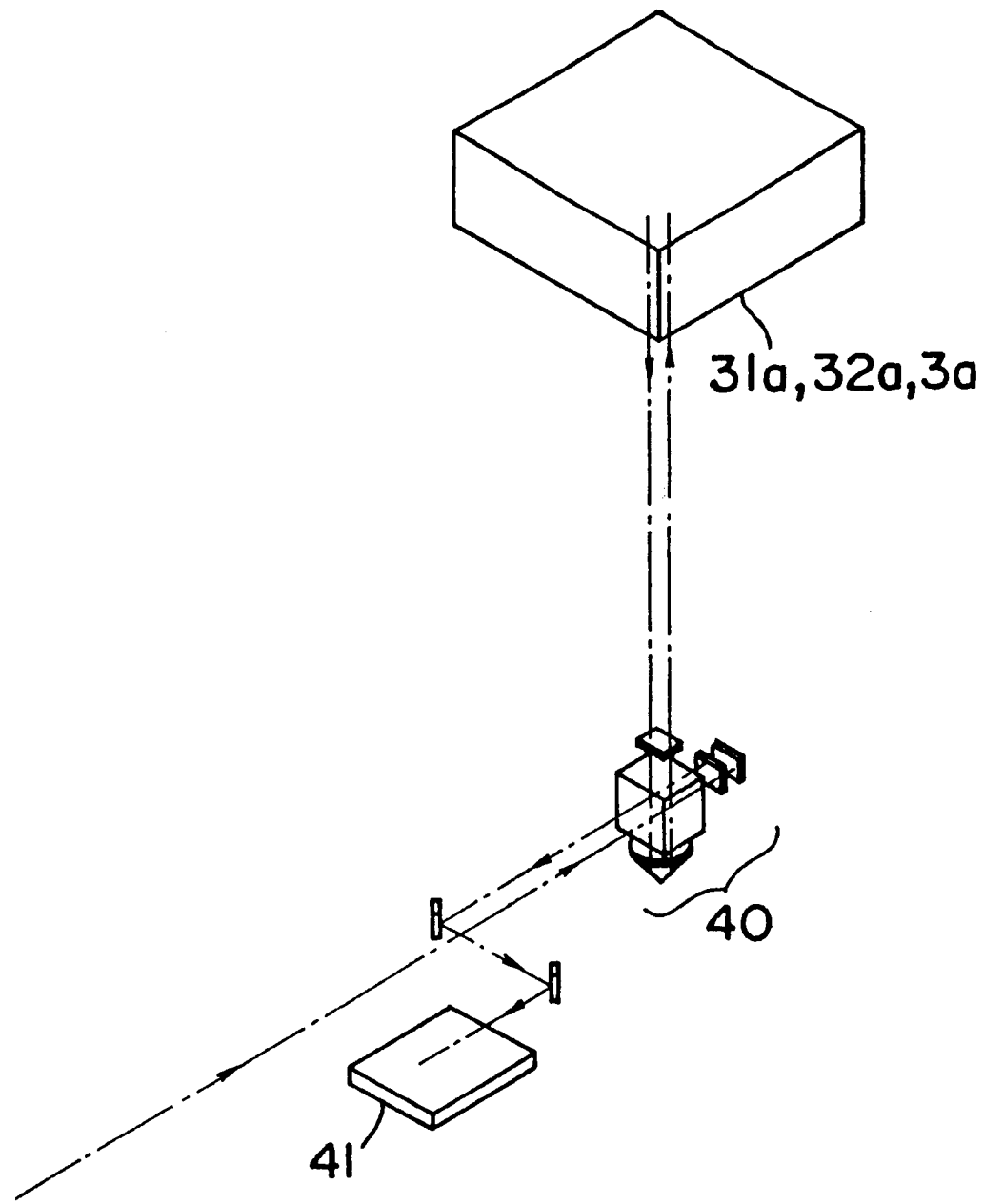
FIG. 10 is a perspective view showing detailed arrangement around the interference unit and receiver provided in the shape measuring apparatus shown in FIG. 3.

The laser light, sent out from the laser light source 33 for irradiation of the X-reference plane 31a, falls on the X-reference plane 31a through prisms 34, 35, mirror 36, and interference unit 40X, and reflected laser light, as a return of the laser light from the X-reference plane 31a, passes through the interference unit 40X before it is conducted to a receiver 41X through a plurality of mirrors. The receiver 41X is a device which performs the function of an X-reference plane measuring unit. Detailed arrangement around the interference unit 40X and receiver 41 is shown in FIG. 10. At the interference unit 40X, the reference light and measuring light are produced as already stated. The reference light and aforesaid reflected light are supplied to the receiver 41X. Thus, at the receiver 41X, the interference signal is produced on the basis of the reference light and the reflected light, and measurement of the quantity of movement of the object 2 in the X-direction is carried out. The output of the receiver 41X is supplied to the control unit 50.

As will be described hereinafter, interference units 40Y, 40Z are provided. Therefore, these interference units may sometimes be collectively referred to as an interference device 40. Likewise, receivers 41Y, 41Z are provided. Therefore, these receivers may sometimes be collectively referred to as receiver 41. Each operation of the interference units 40Y, 40Z is the same as that of the interference unit 40X, and each operation of receivers 41Y, 41Z is the same as that of the receiver 41X. The receiver 41Y is one embodiment which performs the function of a Y-reference plane measuring unit, and the receiver 41Z corresponds to the reference plane measuring unit 18 and is one embodiment which performs the function of a reference plane measuring unit.

Laser light, sent out from the laser light source 33 for irradiation of the Y-reference plane 32a, falls on the Y-reference plane 32a through prisms 34, 35, a mirror, and interference unit 40Y, and reflected laser light, as a return of the laser light from the Y-reference plane 32a, passes through the interference unit 40Y before it is conducted to the receiver 41Y through a plurality of mirrors. At the receiver 41Y, the quantity of movement of the object 2 in the Y-direction is measured, and the output of the receiver 41Y is supplied to the control unit 50.

Laser light, sent out from the laser light source 33 for irradiation of the reference plane 3a, falls on the reference plane 3a through prism 34, mirrors 37–39, and the interference unit 40Z, and reflected laser light, as a return of the laser light from the reference plane 3a, passes through the interference unit 40Z before it is conducted to the receiver 41Z through a plurality of mirrors. At the receiver 41Z, the quantity of displacement in the Z-direction is measured, and the output of the receiver 41Z is supplied to the control unit 50. In the present embodiment, for the purpose of shape measurement in the Z-direction, the control unit 50 performs the function of the earlier described length measuring unit 17. However, a length measuring unit 17 may be provided so that information on measurement in the Z-direction is supplied from the length measuring unit 17 to the control unit 50 as earlier described.

The control unit 50 computes X and Y coordinates being currently scanned on the measured surface 2a of the object 2 on the basis of the information on the quantity of movement which is supplied from the receivers 41X and 41Y. Computation of the Z coordinate will be described hereinafter.

When the object 2 is moved by the Y-table 7 in the Y-direction, the Y-table 7 moves in the X-direction also within a range of corresponding to the undulation component. However, when the Y-table 7 and the object 2 are moved in the X-direction due to the undulation component, the X reference plane 31a for detecting the X-coordinates is also moved due to the undulation component together with the object 2 in the X-direction. Therefore, such movement in the X-direction due to the undulation component is in no way detected as an error. Preferably, the position for irradiation onto the X-reference plane 31a in the Z-direction, for example, should generally coincide with the Z directional position being presently scanned by the probe 4 with respect to the object, that is an aspherical lens 30 as shown by the dotted line. This applies equally to the position for irradiation onto the Y reference plane 32a. The reason why the Z directional position for the laser light irradiation onto the X and Y reference planes 31a and 32a should generally coincide with Z-directional scan position of the probe 4 is that any yawing of the holding base 1 is prevented from affecting the measurement result.

When the probe 4 is scanning in the Z-direction, and if the accuracy of straightness in the movement of the probe 4 in Z direction is unfavorable, a measured spot in the Z-direction would vary, and the X and Y coordinates at the measured spot would shift accordingly, with the result that the accuracy of measurement in the X, Y coordinates with respect to the object 2 would be unfavorable. Therefore, in the shape measuring apparatus 73, the probe 4 is movable in the Z-direction through the intermediary of a known static pressure air bearing 47 as disclosed in Japanese Patent Application Laid-Open No. 6-265340. The static pressure air bearing 47 is mounted to the frame 15 through a bearing 44 which renders the entirety of an object measuring device 48 movable in the Z-direction. The static pressure air bearing 47 enables the probe 4 to move with a straightness deviation of 0.05 μm or less. Therefore, the use of the static pressure air bearing 47 makes it possible to measure the quantity of movement of the object 2 in the X and Y-directions with the order of 0.01 μm.

As already stated with respect to the shape measuring apparatus 71, the spot on the reference plane 3a which is irradiated with the laser light and the spot on the measured surface 2a of the object 2 which is contacted by the probe 4 are so arranged as to be coaxially aligned.

The output of the object measuring device 48 is connected to the control unit 50. The control unit 50 has previously recognized the value of Z coordinate at a reference position, and adds up an output signal Z1 supplied from the object measuring device 48 as the probe 4 moves in the Z-direction which corresponds to the quantity of Z directional movement at a measuring spot, and an output signal Z2 supplied from the receiver 41Z which corresponds to the quantity of displacement. Thereby the control unit 50 calculates a value of Z coordinate at the measuring spot. Thus, the control unit 50 sends out an information on three dimensional shape in the X, Y and Z directions made at the measuring spot.

Other components of the shape measuring apparatus 73 are the same as those of the earlier described shape measuring apparatus 71.

Constructed as described above, the shape measuring apparatus 73 operates as follows.

The object 2 is held on the object mount surface la of the holding base 1, and the probe 4 is held in contact with the measured surface 2a of the object 2. As already stated, respective reference planes 31a, 32a, and 3a are irradiated with laser light. Next, the X-table 6 and the Y-table 7 are driven to actuate the probe 4 into a scan operation. In this case, each of quantities of movement of the object 2 in the X, Y and Z directions, that is, each value of the X, Y and Z coordinates, is measured on the basis of each reflected laser beam which is reflected from respective reference planes 31a, 32a and 3a and according to the laser length-measuring method. In this way, the shape measurement is carried out with respect to the measured surface 2a of the object 2.

Figure 4:
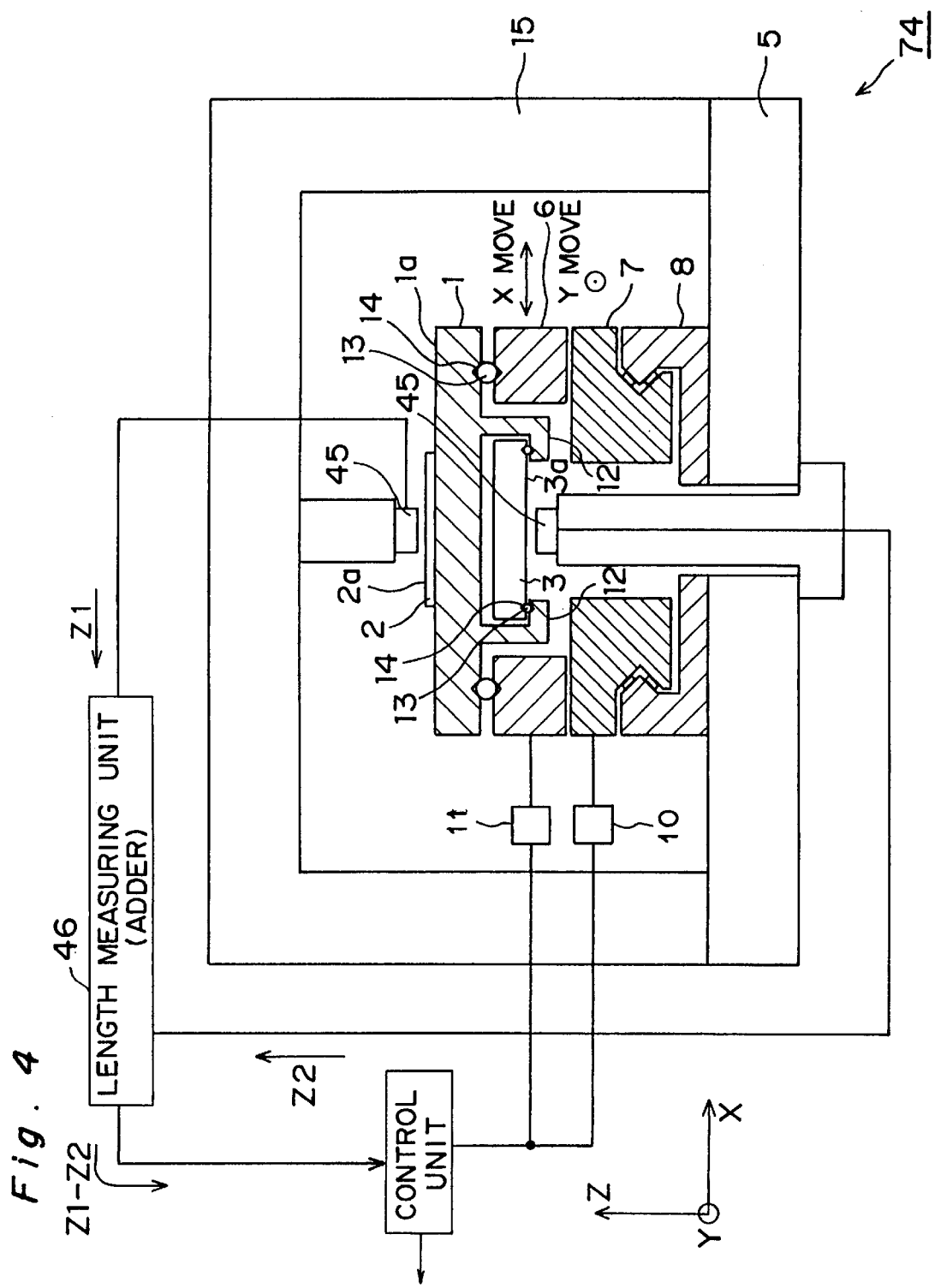
FIG. 4 is a view showing a shape measuring apparatus wherein the measuring device provided in the FIG. 1 shape measuring apparatus is replaced with another measuring device.

In the above described shape measuring apparatus 71, 72, and 73, laser light is used in measuring the quantities of movement in X, Y and Z directions, thereby to measure the shape of the measured surface 2a of the object 2. Means for measurement relative to the reference plane may be of the contact type. Where the reference plane and the measured surface 2a of the object 2 are metal-made, it is possible to use a capacitance sensor 45 which is capable of detecting variations in capacitance between the reference plane or measured surface 2a and the sensor as shown in FIG. 4. A shape measuring apparatus 74 shown in FIG. 4 is such that capacitance sensors 45, 45, and a length measuring device 46 for sending measurement results for measured surface 2a on the basis of output signals Z1, Z2 from the capacitance sensors 45, 45 are provided in place of the device for irradiating the reference plane 3a with laser light, and the object measuring device 16 for measuring the shape of the measured surface 2a which includes the probe 4 in the shape measuring apparatus 71 shown in FIG. 1. In other components, the apparatus 74 is not different from the shape measuring device 71 in FIG. 1.

Where such the capacitance sensor 45 is used, such a shape measuring apparatus is not suitable for use in such a wide measurement range as in the case light is us light is used, for example. However, the use of such the sensor makes it possible to simplify the construction of the measuring system and reduce the cost of manufacture. Further, the measurement can be made non-contact with the reference plane 3a and the like as in the case where laser light is used and, therefore, high precision measurement can be constantly made without any variation being caused to the reference plane 3a, etc.

The static pressure air bearing 47 may be applied to the shape measuring apparatus 71, 72, 74.

In this way, the shape measuring apparatus 71–74 of the present embodiments include the reference plane movable integrally with the object 2 so that the measured surface 2a of the object 2 and the reference plane can be simultaneously scanned. Therefore, if the X and Y-tables sway or bend at a micrometer order level, the object 2 and the reference plane will sway or bend integrally with each other. Therefore, unless any change occurs in relative positions of the reference plane and the object 2a, measurement accuracy is not limited by any moving straightness deviation of the X and Y-tables, and the shape of the measured surface 2a can be measured at the precision level of the reference plane which is about 2-digits higher in precision than the moving straightness deviation of the X and Y-tables.

In the above described shape measuring apparatus 71, 72, and 74, three-dimensional shape information taken in the X, Y and Z directions at the point of measurement is computed. However, where high precision is not required with respect to the quantity of movement in the X, Y and Z-directions, it may be so arranged that shape information in the Z-direction only at the point of measurement is obtained from the length measuring unit 17 or 46. Where only Z-directional shape information is obtained in this way, the Z-direction does not necessarily mean the vertical direction.

Figure 9:
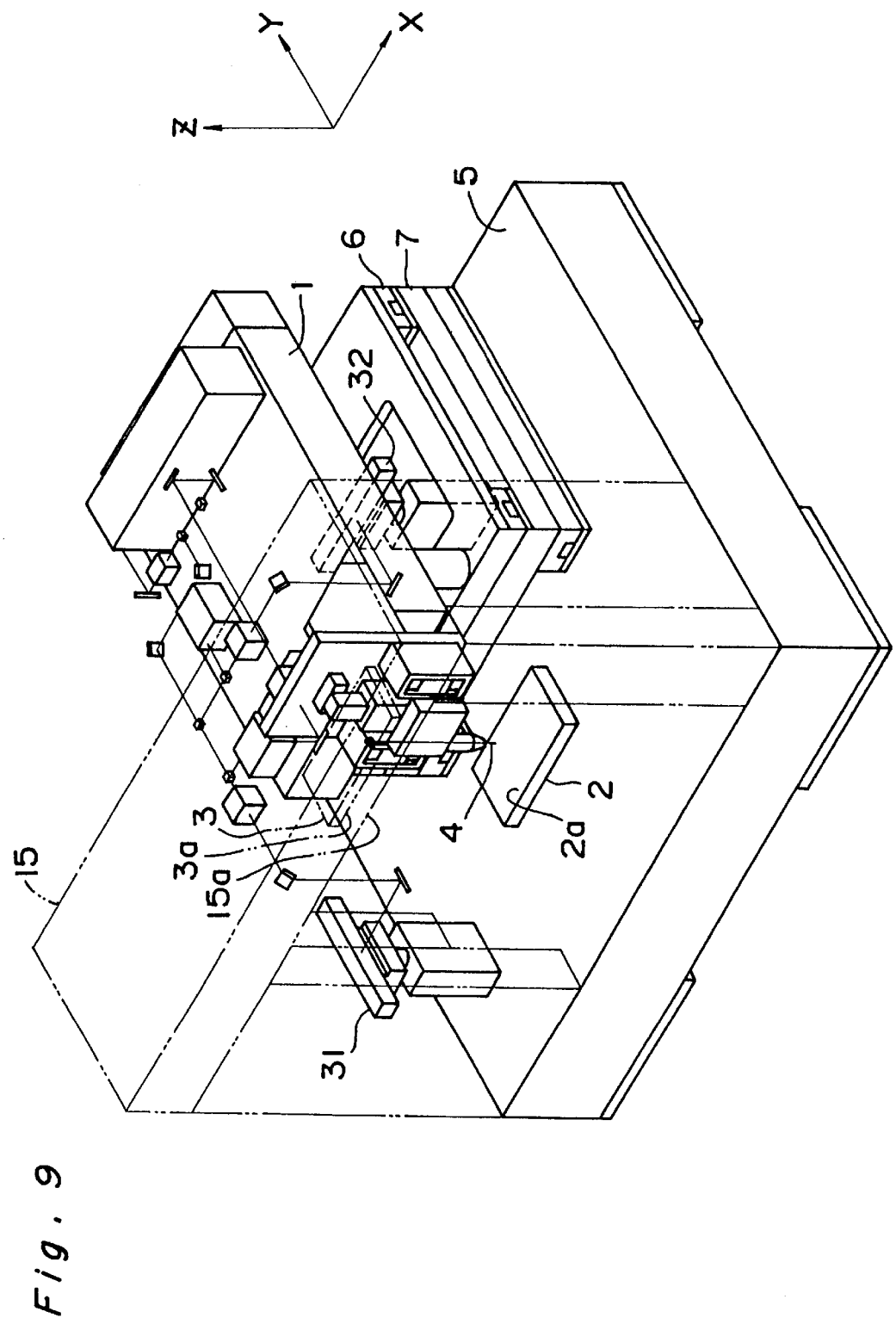
FIG. 9 is a perspective view showing the construction of a still other form of a shape measuring apparatus of an embodiment of the present invention.

The above described shape measuring apparatuses 71–74 are all of the type in which the object 2 is moved, whereas the object measuring device 16, etc. is held stationary. Conversely, an apparatus may be of such a type as a shape measuring apparatus 75 shown in FIG. 9 in which the object 2 is held stationarily on the lower stone surface plate 5, whereas the object measuring device 48 or the like is movable in the X and Y-directions. In FIG. 9, a reference plate 3 having a reference plane 3a is shown by a two-dot chain line, the reference plate 3 being fixed to an opposite surface 15a of a frame 15 shown by a two-dot chain line. The term "opposite surface 15a" means a surface of the frame 15 which extends in a direction perpendicular to the Z-direction, that is, a surface opposite to the measured surface 2a of the object 2.

In the shape measuring apparatus 75 shown in FIG. 9, probe 4 is set at a location spaced in the Y-direction from the region in which is laid a rail fixed to the lower stone surface plate 5 of the Y-table 7. In FIG. 9, therefore, where shape measurement is made with respect to an object which is elongated in the Y-direction, if the measurement range in the Y-direction is up to 200 mm, there is no problem with the shape measuring apparatus 75 since a distance in which the rail and the Y-table 7 are in engagement is rather long, however, if the distance is longer, for example 400 mm, a length of the engagement between the rail on the Y-table 7 and the probe 4 may be at least 400 mm. As such, the length of aforesaid engagement is so short that the weight balance of the X and Y-tables becomes unfavorable. Therefore, the probe 4 is rendered liable to the influence of oscillation, resulting in poor measurement accuracy.

Figure 11:
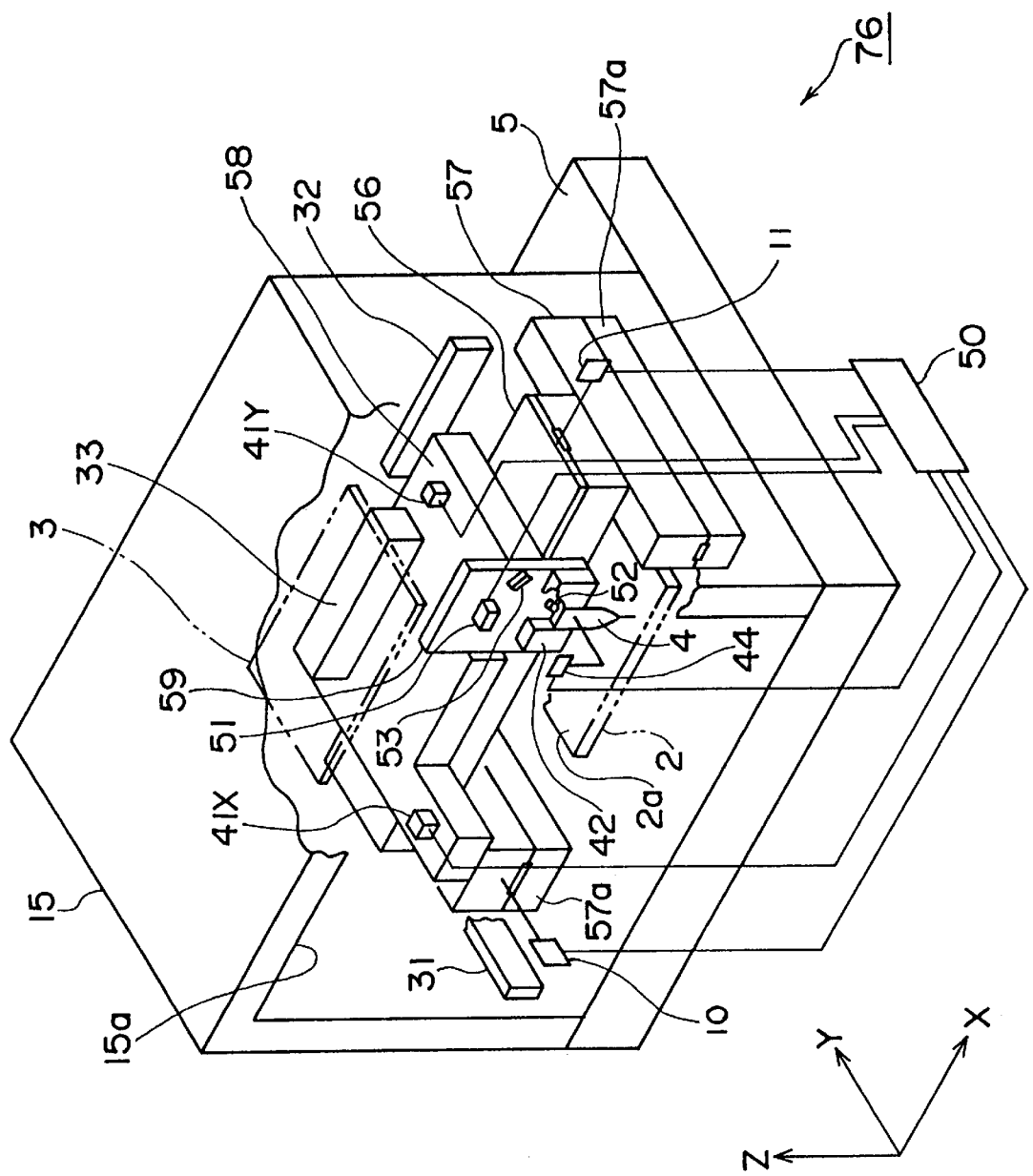
FIG. 11 is a perspective view showing the construction of a still further form of a shape measuring apparatus of an embodiment of the present invention.

Shown in FIG. 11 is a shape measuring apparatus 76 capable of measuring a large object which is elongated in the Y-direction, for example. The shape measuring apparatus 76 of such configuration will be described hereinbelow. It is noted that the shape measuring apparatus 76 is of the type in which a measuring device is to be moved while the object 2 is held stationary.

The object 2 is held stationary directly on a lower stone surface plate 5 which corresponds to the lower surface plate, or the object 2 is held stationary in position through a lift plate (not shown) set on the lower stone surface plate 5 which enables the object 2 to be elevated and lowered. Mounted on the lower stone surface plate 5 is a gantry type Y-table 57 placed across a pair of legs 57a, 57a erected in parallel relation in the Y-direction and movable along the Y-direction, with the object 2 held between the legs. On the Y table 57 is set an X-table 56 which is movable on the Y-table along the X-direction perpendicular to the Y-direction. An upper surface plate 58 is mounted on the X-table 56 as supported by balls at three points in the same way as the earlier described holding base 1 is so supported. Though not shown in FIG. 11, such an optical system for conducting laser light for performing measurement in the X, Y and Z-directions as the optical system set on the holding base 1 shown in FIG. 9 is set on the upper surface plate 58. A base plate 59 is fixed to the upper surface plate 58, and a Z-table 42 movable along the Z-direction is mounted on the base plate 59. Mounted on the Z-table 42 is a probe 4 for measuring the quantity of displacement of the measured surface 2a of the object 2 in the Z-direction. A front end portion of the probe 4 is internally provided with a stylus 54 for contacting the measured surface 2a and a mirror 55 set integrally with the stylus 54. The static pressure air bearing 47 as provided in the earlier described shape measuring apparatus 73 may be provided in the probe 4.

As is the case with the frame 15 shown in FIG. 9, a frame 15 is erected on the upper surface plate 58 in such a way as to cover the range of movement of the probe 4 in the X and Y-directions. A reference plate 3 having a reference plane 3a is mounted to an opposite surface 15a of the frame 15 in such a way as to cover the range of movement of the probe 4 in the X and Y-directions as in the case of the earlier described shape measuring apparatus 75.

Further, as in the same way as in the earlier described shape measuring apparatus 75, an X reference plane 31a and a Y reference plane 32a are set on the lower stone surface plate 5. Also, as in the same way as in the shape measuring apparatus 75, on the upper surface plate 58 are provided an object measuring device 51, an X reference plane measuring device 41X, and a Y directional reference plane measuring device 41Y. The object measuring device 51 measures a distance Z1 in the Z-direction between a Z directional laser light supply reference point and the reference plane 3a and a distance Z2 between the laser light supply reference point and the mirror 55 in generally coaxial relation on the upper surface plate 58 and then measures a distance in the Z-direction. The X reference plane measuring device 41X measures the distance in the X-direction between an X directional laser light supply reference point and an X reference plane 31a on the upper surface plate 58. The Y directional reference plane measuring device 41Y measures the distance in the Y-direction between a Y directional laser light supply reference point and a Y reference plane 32a on the upper surface plate 58. As described with respect to the shape measuring apparatus 73, there is provided a control unit 50 which performs a function such as three dimensional shape measurement of the measured surface on the basis of the Z-directional distance, X-directional distance, and Y-directional distance.

Figure 12:
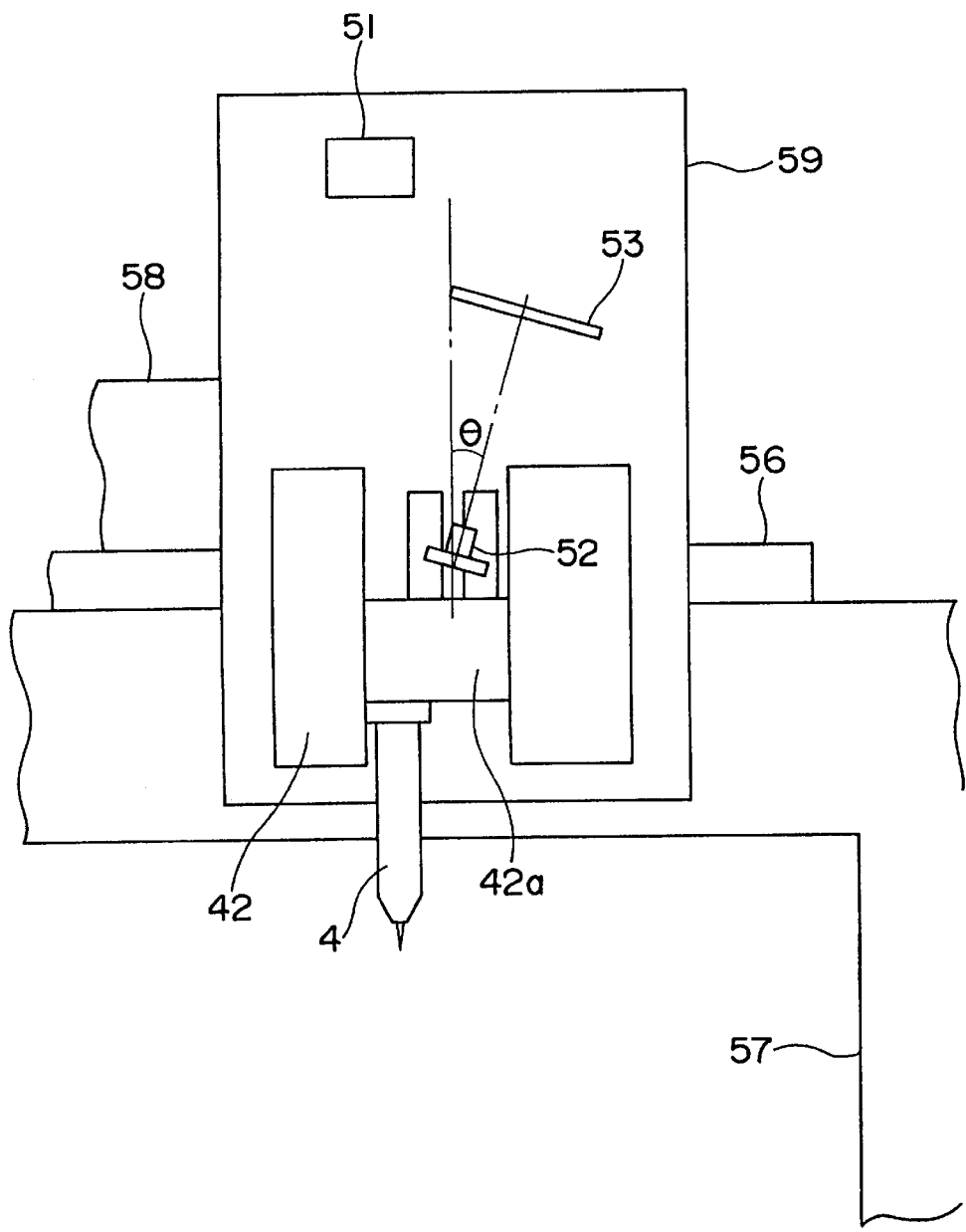
FIG. 12 is a front view depicting an arrangement around the probe shown in FIG. 11, with the light source disposed at an angle to the Z direction.

In the shape measuring apparatus 76, operation other than the measurement of the measured surface 2a by means of the stylus 54, such as movement of the probe 4 in the Z-direction for roughly positioning the probe 4 in a Z-directional target position, is carried out by a Z-table 42. In order to measure the quantity of movement of the probe 4 in the Z-direction, a light source 52 and an optical position sensor 53 are provided as shown in FIG. 12. The reason for provision of such mechanism for measuring the quantity of movement is as follows. In the shape measuring apparatus 76, as already stated, a length measurement of the object 2 is carried out by preparing an interference signal on the basis of the reference light and the reflected light and counting the interference fringes in the interference signal. Therefore, the point at which the counting starts is free to decide, and the start point for the length measurement is freely changeable. Such start point cannot be stored through an on-off operation of the power source for the measuring device. Whilst, the probe 4 is required to follow the measured surface 2a in smooth response thereto and with high precision. Therefore, a voice coil type linear motor is employed for driving the probe 4 in the Z-direction. During the shape measurement of the measured surface 2a, the linear motor is driven to move the probe 4 in the Z-direction on the basis of a focus error signal obtained from the probe 4. However, when the probe 4 is to be moved to a point adjacent the measured surface 2a, a mechanism for detecting an approximate Z-directional position of the probe 4 is required.

Figure 13:
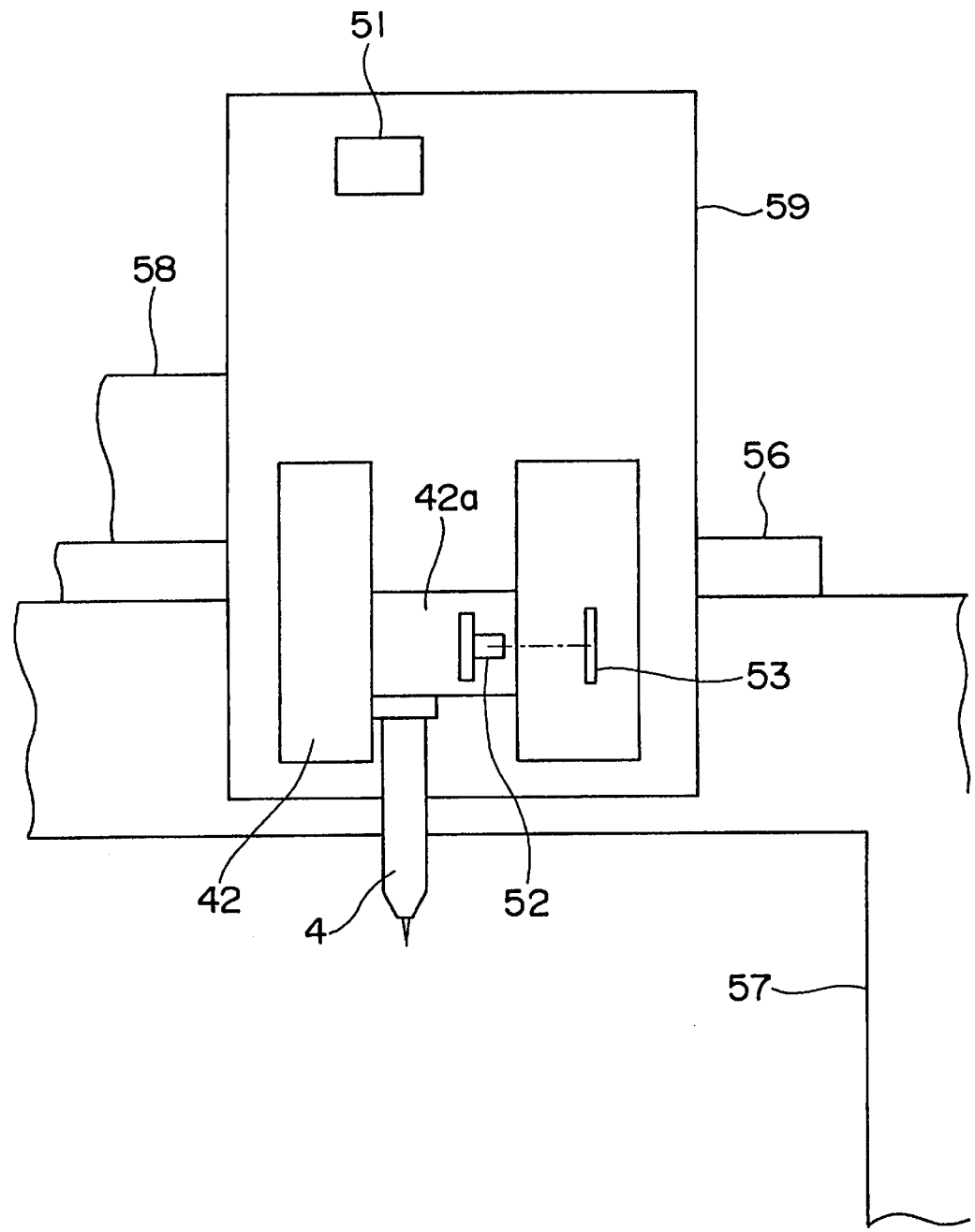
FIG. 13 is a front view depicting an arrangement around the probe shown in FIG. 11, with the light position sensor arranged in parallel in the Z direction.
Figure 14:
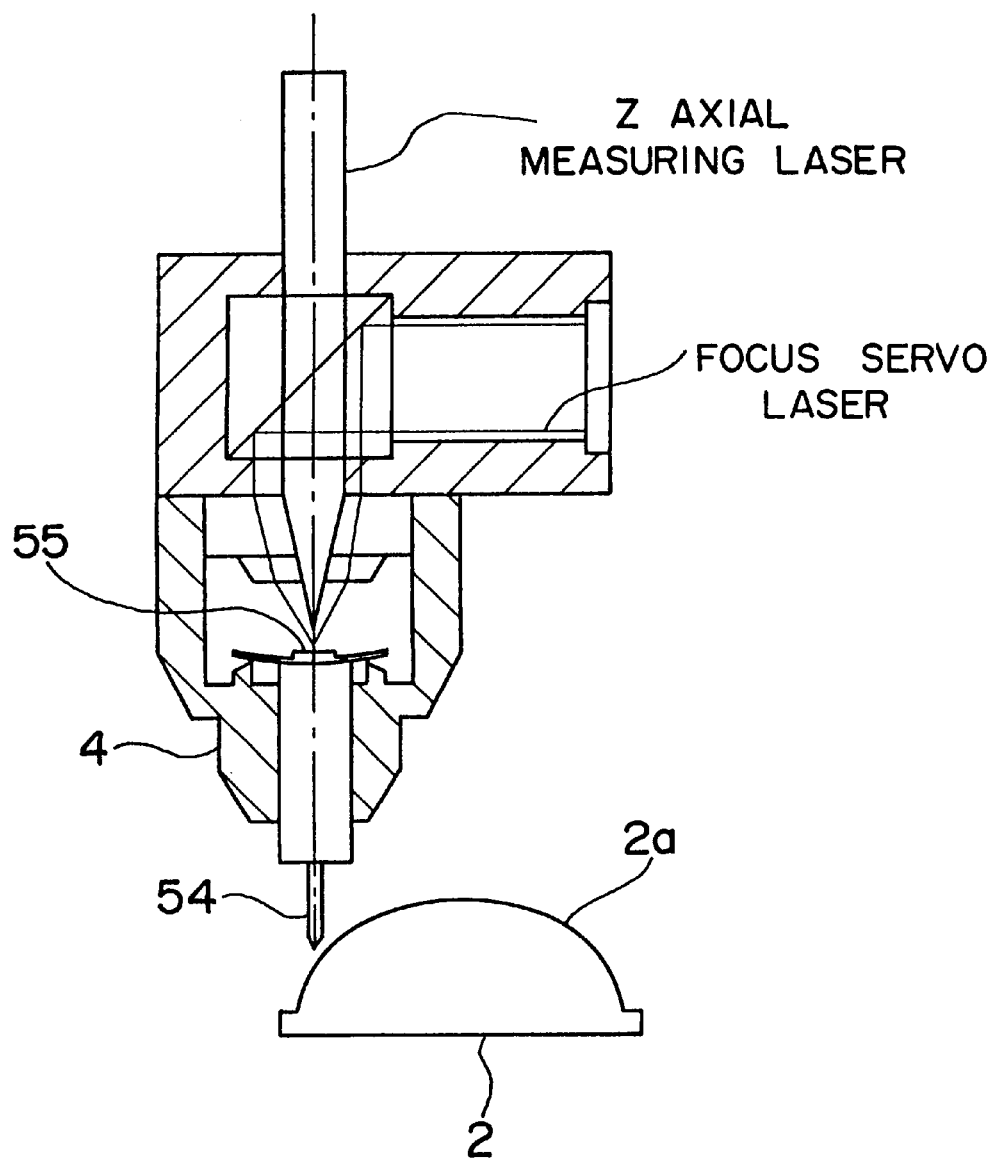
FIG. 14 is a sectional view showing the interior construction of a front end portion of the probe shown in FIG. 11.
Figure 15:
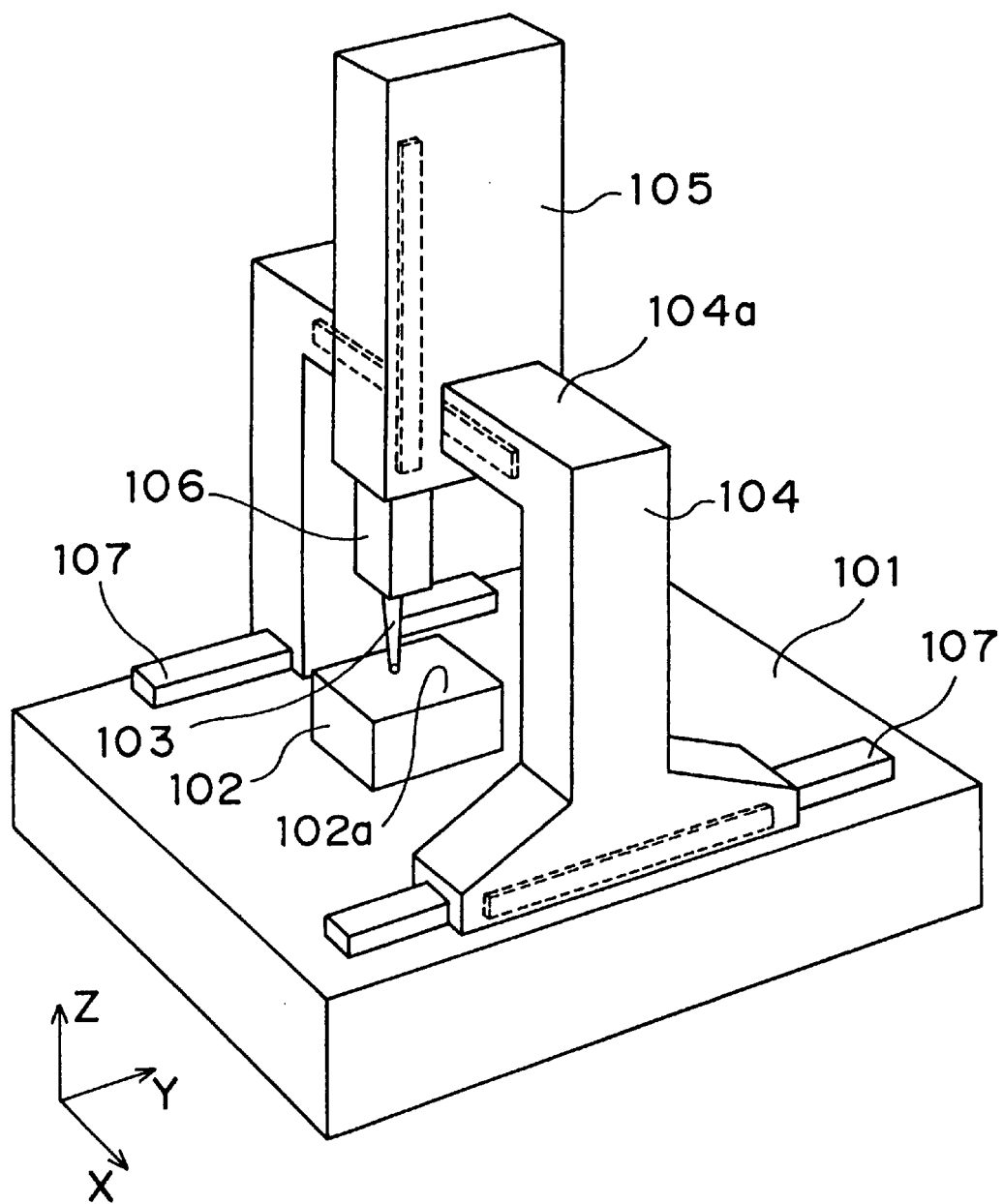
FIG. 15 is a perspective view showing a shape measuring apparatus of the prior art.

In the shape measuring apparatus 76, the light source 52 is mounted to a drive unit 42a corresponding to the linear motor portion which actuates the probe 4, while the optical position sensor 53 is fixed in position on the base plate 59 fixed to the upper surface plate 58. The light source 52 emits laser light toward the optical position sensor 53 in such a manner as to minimize diffusion of light, and is disposed at an inclined angle so that the laser light is emitted at an angle θ to the Z-direction. The reason why an arrangement is made such that the laser light is emitted at the angle inclined in the Z-direction will be explained. The light source 52 and the optical position sensor 53 may be set in such a way that the optical position sensor 53 is disposed with a light reception surface thereof extending in the longitudinal direction of the optical position sensor 53 being placed in parallel with the Z-direction as illustrated in FIG. 13. However, the longitudinal length of a commercially available optical position sensor 53 is on the order of 50 mm maximum. Therefore, with the arrangement as shown in FIG. 13, the optical position sensor cannot be used in case that the probe 4 is moved in excess of the 50 mm length. Therefore, by so arranging that the laser light is emitted at the angle of θ against the Z-direction as stated above, the optical position sensor 53 is made to have a length corresponding to L×sin θ, where L is the quantity of movement of the probe 4 in the Z-direction. Even when the prove 4 is moved with 100 mm (=L) in the Z-direction, if the angle of θ is 30 degrees, the longitudinal length of the optical position sensor 53 may be 50 mm (=100×sin 30). Therefore, even if the probe 4 is moved more than 50 mm in the Z-direction, the commercially available optical position sensor can be used.

A measuring operation of the shape measuring apparatus 76 of such construction may be made in the same way as in the case of the earlier described shape measuring apparatus 73, and 75. Therefore, description of such operation is not repeated.

According to the shape measuring apparatus 76, the X- and Y-tables 56, 57 are provided so as to cover the object 2, and the probe 4 is disposed between rails of the Y-table 57. Therefore, even if the object 2 is elongated in the Y-direction, the shape measurement can be performed with high precision.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A shape measuring apparatus for measuring the shape of a measured surface of an object-to-be-measured by using an object measuring device, comprising:

a holding base operable to hold the object on a surface of said holding base, with a reference plane provided on a back side of said holding base;

a reference plane measuring device operable to scan a reference side-spot on the reference plane which is located on an axial line extending in a direction of thickness of said holding base, the reference side-spot corresponding to a measured side-spot on the measured surface scanned by the object measuring device and being scanned simultaneously with the scanning of the measured side-spot, thereby measuring a quantity of displacement of the reference plane in the direction of thickness of said holding base; and a length measuring unit operable to compute shape information on the measured surface in relation to the reference plane on the basis of information on relative positions of the reference plane and an object mount surface of said holding base, shape measurement information fed by the object measuring device upon relative movement of said holding base and the object measuring device, and the quantity of displacement fed by said reference plane measuring device.

2. The shape measuring apparatus as set forth in claim 1, wherein said holding base is mounted on moving beds which are respectively movable in X and Y directions perpendicular to a vertical direction and orthogonal to each other, therefore said holding base is moved along the X and Y directions, whereas the object measuring device and said reference plane measuring device are fixed in place.

3. The shape measuring apparatus as set forth in claim 2, wherein laser light is used in measuring the quantity of displacement of the reference plane.

4. The shape measuring apparatus as set forth in claim 2, wherein said holding base is supported on one of the moving beds at three points.

5. The shape measuring apparatus as set forth in claim 1, further comprising;

said holding base including an X reference plane and a Y reference plane which extend in the X and Y directions respectively when the object and the reference plane are arranged along the vertical direction and in a rectangular relation to the direction of the thickness of said holding base;

an X reference plane measuring unit operable to measure a quantity of relative movement in the X direction of said holding base;

a Y reference plane measuring unit operable to measure a quantity of relative movement in the Y direction of said holding base;

a control unit operable to receive the quantity of relative movement in the X direction, the quantity of relative movement in the Y direction; and the shape information fed from said length measuring unit, and to perform three-dimensional shape measurement of the measured surface on the basis of the quantity of relative movement in the X direction, the quantity of relative movement in the Y direction, and the shape information.

6. The shape measuring apparatus as set forth in claim 5, wherein said holding base is mounted on moving beds which are respectively movable in X and Y directions perpendicular to a vertical direction and orthogonal to each other, therefore said holding base is moved along the X and Y directions, whereas the object measuring device, said reference plane measuring unit, said X reference plane measuring unit, and said Y reference plane measuring unit are fixed in place.

7. The shape measuring apparatus as set forth in claim 6, wherein laser light is used in measuring the quantity of displacement of the reference plane and in measuring the quantities of relative movement in the X and Y directions with the X reference plane and Y reference plane used in connection therewith, and wherein the quantities of relative movement in the X and Y directions are calculated on the basis of each phase variation in reflected light from the X reference plane and Y reference plane, each phase variation being detected by counting each interference signal formed by an interference between the respective laser light irradiated on the X and Y reference planes and the respective reflected light therefrom.

8. The shape measuring apparatus as set forth in claim 5, wherein laser light is used in measuring the quantity of displacement of the reference plane and in measuring the quantities of relative movement in the X and Y directions with the X reference plane and Y reference plane used in connection therewith, and wherein the quantities of relative movement in the X and Y directions are calculated on the basis of each phase variation in reflected light from the X reference plane and Y reference plane, each phase variation being detected by counting each interference signal formed by an interference between the respective laser light irradiated on the X and Y reference planes and the respective reflected light therefrom.

9. The shape measuring apparatus as set forth in claim 5, wherein said reference plane measuring device is an electrostatic capacity type device operable to measure variations in electrostatic capacity between the reference plane and said electrostatic capacity type device.

10. The shape measuring apparatus as set forth in claim 1, wherein laser light is used in measuring the quantity of displacement of the reference plane.

11. The shape measuring apparatus set forth in claim 1, said reference plane measuring device is an electrostatic capacity type device operable to measure variations in electrostatic capacity between the reference plane and said electrostatic capacity type device.

12. The shape measuring apparatus as set forth in claim 1, wherein the object measuring device includes a probe which contacts the measured surface of the object, the probe being set in place through a static pressure air bearing.

13. A shape measuring apparatus for measuring a shape of a measured surface of an object-to-be-measured placed on a lower surface plate and fixed thereto by moving an object measuring device, the apparatus comprising:

a gantry-type Y table mounted across a pair of legs erected on the lower surface plate which extend in parallel in Y-direction with the object disposed therebetween, the Y table being movable in the Y-direction;

an X table set on said gantry-type Y table and movable on the Y table in X-direction perpendicular to the Y-direction;

an upper surface plate disposed on said X table and including length measuring optical systems oriented in X, Y and Z directions which utilize laser light;

a Z table mounted to the upper surface plate and movable in the Z direction;

a probe mounted to said Z table operable to measure a quantity of displacement of the measured surface in the Z direction, said probe including a stylus contacting the measured surface and a mirror provided integrally with the stylus;

a frame set upright on the lower surface plate and having a Z reference plane to be used for measurement by said probe of the quantity of displacement in the Z direction, the Z reference plane covering the range of movement of said probe;

an object measuring device operable to measure a distance Z1 between the upper surface plate and the Z reference plane and a direction Z2 between the upper surface plate and the mirror on a generally coaxial basis, thereby to measure a distance in the Z direction;

an X reference plane provided on the lower surface plate operable to be used in measuring a quantity of movement of said X table in the X-direction;

an X reference plane measuring unit operable to measure a distance between the upper surface plate and the X reference plane in the X-direction;

a Y reference plane provided on the lower surface plate operable to be used in measuring a quantity of movement of said Y table in the Y-direction;

a Y reference plane measuring unit operable to measure a distance between the upper surface plate and the Y reference plane in the Y-direction; and a control unit operable to perform a three-dimensional measurement of the measured surface on the basis of the Z directional distance, the X directional distance, and the Y directional distance.

14. The shape measuring apparatus as set forth in claim 13, further comprising a light source provided on said Z table operable to detect the position of said Z table in the Z direction, and a light position sensing unit provided on the upper surface plate operable to detect a position irradiated with a light beam emitted from said light source.

15. The shape measuring apparatus as set forth in claim 14, wherein said light source is a laser light source which emits laser light in a direction inclined toward the Z direction.

16. The shape measuring apparatus as set forth in claim 13, wherein said probe is set in position through a static pressure air bearing.

17. A shape measuring method for measuring a shape of an object-to-be-measured by employing a shape measuring apparatus which has a holding base for holding the object on a front surface of the holding base, with a reference plane provided on a back side of the holding base, and which recognizes information on relative positions of an object mount surface and the reference plane, the shape measuring method comprising:

moving an object measuring device for measuring a shape of a measured surface of the object and the holding base in relation to each other, thereby causing the object measuring device to scan the measured surface to provide information on shape measurement of the measured surface;

scanning a reference side-spot on the reference plane by a reference plane measuring device simultaneously with the scanning of the measured surface by the object measuring device, the reference side-spot being located on an axial line extending in a direction of thickness of the holding base, and corresponding to a spot scanned by the object measuring device;

measuring a quantity of displacement of the reference plane in the direction of thickness of said holding base on the basis of the scanning on the reference plane by the reference plane measuring device; and computing shape information on the measured surface relative to the reference plane and on the basis of the shape measurement information, the quantity of displacement, and the information on the relative positions.

\* \* \* \* \*